United States Patent
Joern

(10) Patent No.: US 9,656,737 B2
(45) Date of Patent: May 23, 2017

(54) AIRCRAFT FUSELAGE

(75) Inventor: Paul J. Joern, Hamburg (DE)

(73) Assignee: Airbus Operations GmbH (DE)

( * ) Notice: Subject to any disclaimer, the term of this patent is extended or adjusted under 35 U.S.C. 154(b) by 1643 days.

(21) Appl. No.: 12/793,114

(22) Filed: Jun. 3, 2010

(65) Prior Publication Data

US 2010/0308168 A1 Dec. 9, 2010

Related U.S. Application Data

(60) Provisional application No. 61/184,010, filed on Jun. 4, 2009.

(30) Foreign Application Priority Data

Jun. 4, 2009 (DE) .......................... 10 2009 023 856

(51) Int. Cl.
  *B64C 1/06* (2006.01)
  *B64C 1/14* (2006.01)
(52) U.S. Cl.
  CPC ............ *B64C 1/068* (2013.01); *B64C 1/1492* (2013.01)

(58) Field of Classification Search
  CPC .............................. B64C 1/068; B64C 1/1492
  USPC ........................................ 244/119, 121, 129.3
  See application file for complete search history.

(56) References Cited

U.S. PATENT DOCUMENTS

| | | | |
|---|---|---|---|
| 3,429,530 A | 2/1969 | Hertel | |
| 2003/0234322 A1* | 12/2003 | Bladt et al. | 244/129.3 |
| 2011/0017870 A1* | 1/2011 | Gallant et al. | 244/129.3 |

FOREIGN PATENT DOCUMENTS

| | | |
|---|---|---|
| DE | 9217393 U1 | 4/1994 |
| EP | 1 375 339 A2 | 1/2004 |

* cited by examiner

*Primary Examiner* — Valentina Xavier
(74) *Attorney, Agent, or Firm* — Lerner, David, Littenberg, Krumholz & Mentlik, LLP

(57) ABSTRACT

An aircraft fuselage includes an exterior skin; at least one window frame; at least one window package disposed in a breakout of the exterior skin and attached to the at least one window frame; and a plurality of stiffening elements configured to stiffen the exterior skin, wherein at least one of the stiffening elements crosses the at least one window package.

10 Claims, 1 Drawing Sheet

AIRCRAFT FUSELAGE

CROSS REFERENCE TO PRIOR APPLICATIONS

Priority is claimed to German Application No. DE 10 2009 023 856.5, filed Jun. 4, 2009 and to U.S. Provisional Application No. 61/184,010, filed Jun. 4, 2009.

FIELD

The invention relates to an aircraft fuselage.

BACKGROUND

It is a general requirement in aircraft construction to create passenger aircraft with window sections that have the largest possible area. However, conventionally, the window sections are bound to positions between adjacent frame elements, which due to the short distance between frame elements results in comparatively small-area window sections. While with wider frame element spacing it would be possible to arrange the window sections more flexibly and design them so that they cover a larger area, very strongly dimensioned reinforcement structures would have to surround the window sections because the window sections themselves are not structural elements. This would result in additional aircraft weight. The larger distance between frame elements would furthermore have a negative effect on the stability of the aircraft fuselage so that in order to avoid stability loss the entire backing structure would have to be modified.

In other known solutions the window sections are arranged directly on the system line of the respective frame element, and above and below the window sections the frame elements make a transition to the respective window frame. While in principle this makes it possible to produce large-area window sections, here again the window sections are bound to fixed positions. Furthermore, the production, installation and repair of these solutions are relatively expensive.

The German utility model DE 92 17 393 U1 proposes an aircraft fuselage in which the frame elements extend across the window sections. In each case the window sections are formed by a window package which on the circumference is directly integrated in the aircraft fuselage. The aircraft fuselage comprises a plastics-based laminate and is designed in a single piece with the window packages and the frame elements. In this solution in particular the integral design is critical. Furthermore, the solution is associated with a disadvantage in that the window packages are designed as structural load-bearing components, and occurring loads are introduced directly to the window packages. Thus the windows must be arranged in the regions that experience the lightest loads, and the possible positions of the windows are limited accordingly.

SUMMARY OF THE INVENTION

An aspect of the present invention is to provide an aircraft fuselage that eliminates the above-mentioned disadvantages and that allows great flexibility of the window packages, or of their position and size, in the aircraft fuselage.

An aircraft fuselage according to the invention has a plurality of window packages that are arranged in breakouts of an exterior skin. The fuselage further comprises a plurality of stiffening elements for stiffening the exterior skin, at least some of which stiffening elements cross the window packages. According to the invention the aircraft fuselage is built in a differential manner and the window packages are attached to window frames.

The solution according to the invention is advantageous in that the window packages can be optimally placed in relation to occurring loads, and can thus be flexibly arranged in the aircraft fuselage. This makes it possible to save weight because the loads do not have to be elaborately guided around the breakouts, and said breakouts do not require additional reinforcement. Furthermore, the window packages are not bound to frame element spacings, and as a result of the harmonic force distributions can be designed so as to cover a large area. According to the invention, a window design is thus created that overcomes the known weight disadvantages and flexibility disadvantages while making it possible to implement large-area window sections.

In one embodiment the stiffening elements comprise at least one recess for leading the window frame through, which recess can be designed so as to be similar to a hitherto-used opening in the frame element when intersecting a stringer, so that known installation concepts can be used.

In another embodiment the stiffening elements cross the window packages in a bridge-like manner. This can, for example, take place by step formation or arch formation, as a result of which it becomes possible to avoid materials weakness of the stiffening elements in the window region.

Preferably, the stiffening elements are designed as circumferential stiffeners and/or longitudinal stiffeners such as frame elements and stringers. This makes it possible to use known frame element arrangements or stringer arrangements and installation concepts.

However, the stiffening elements can also be designed as intersecting grid stays, thus forming a stiffening grid that is arranged on the interior circumference of the exterior skin and that partly or fully carries out stiffening functions of stringers and frame elements. This makes additional savings in weight possible.

In an embodiment each window package comprises an exterior window and an interior window, wherein the stiffening elements support at least one of the windows. This makes a material-optimised design of the windows possible.

Preferably, the stiffening elements extend between the interior window and a protective window on the cabin side. With this arrangement the stiffening element is protected from damage by passengers. In addition, in this manner thermal insulation of the stiffening elements can be achieved because during a flight they can assume temperatures far below those of the cabin interior.

The stiffening elements can be metal components or fibre-composite material components. Likewise, the exterior skin of the aircraft fuselage can be a metal component or a fibre composite component. In this way it is possible to flexibly react, for example, to material requirements of the airlines.

BRIEF DESCRIPTION OF THE DRAWINGS

Below, preferred exemplary embodiments of the invention are explained in more detail with reference to diagrammatic illustrations. The following are shown.

Identical design elements in the figures have the same reference characters.

DETAILED DESCRIPTION

Figure 1:
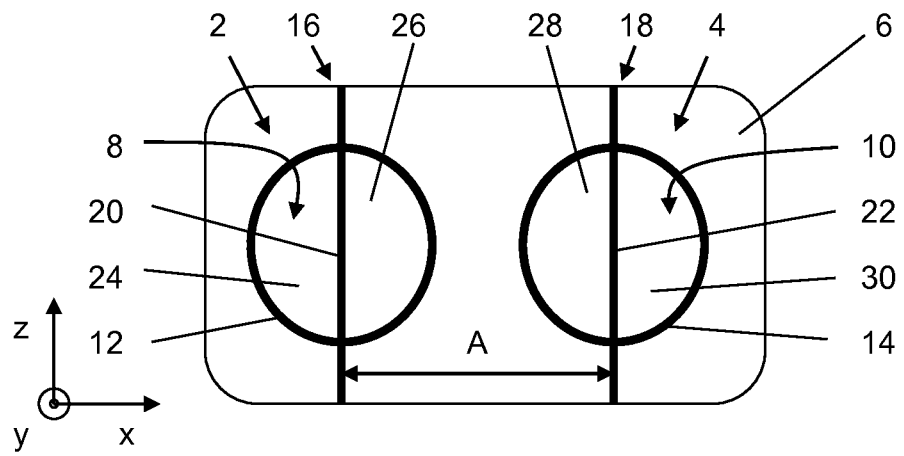
FIG. 1 a top view of a first exemplary embodiment according to the invention.

FIG. 1 shows a top view of two oval window systems 2, 4, each accommodated in a breakout of an exterior skin 6 of an aircraft fuselage. Each window system 2, 4 comprises a window package 8, 10 and a window frame 12, 14. The window frames 12, 14 are attached to the breakouts and in each case circumferentially comprise a window package 8, 10.

The exterior skin 6 is reinforced by way of a plurality of stiffening elements 16, 18 arranged side by side in the direction of the longitudinal axis x of the aircraft. In this embodiment the stiffening elements are frame elements 16, 18 that were made separately from the exterior skin 6. Thus, the aircraft fuselage is built in a differential manner from a plurality of individual components such as the exterior skin 6, frame elements 16, 18 and window systems 2, 4. In the exemplary embodiment shown the exterior skin 6, the frame elements 16, 18 and the window frames 12, 14 each comprise a fibre composite material, for example a carbon-fibre reinforced plastic.

The frame elements 16, 18 are attached on the interior circumference to the exterior skin 6 and are spaced apart from each other at a constant distance A. In each case one of their body sections 20, 22 crosses the window systems 2, 4 so that in each case two window sections 24, 26 and 28, 30 are formed. For spanning the window systems 2, 4, in the region of the frame element sections 20, 22 a recess is formed in the frame elements 16, 18. The design of the window systems 2, 4 and the crossing of the body sections 20, 22 of the window packages 8, 10 is shown in FIG. 2 with reference to the shown left-hand window system 2 or window package 8.

Figure 2:
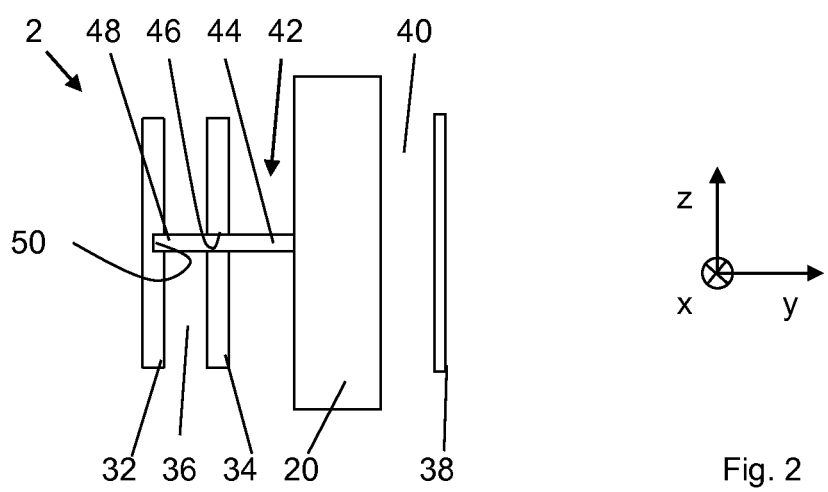
FIG. 2 a section of the first exemplary embodiment.

According to the section view in FIG. 2, the window package 8 comprises an exterior window 32 and an interior window 34 that is spaced apart from the former. The two windows 32, 34 delimit an interior space 36 in the direction of the transverse axis y of the aircraft and assume structure-stiffening functions, wherein the interior window 34 is predominantly provided as a replacement for the exterior window 32 and for thermal reasons. On the circumference the interior space 36 is delimited by the window frame 12 (not shown in this illustration). Furthermore, a protective window 38 on the cabin side is provided, which in the direction of the transverse axis y of the aircraft delimits a space 40 to the interior window 34, and on the circumference is also encompassed by the window frame 12.

The body section 20 of the frame element 16 extends in the direction of the vertical axis z of the aircraft through the space 40, wherein said body section 20 is spaced apart from the interior window 34 and from the protective window 38. Thus the body section 20 is protected from being damaged by passengers, and in addition is thermally insulated from the cabin.

In order to stabilise the exterior window 32 a support 42 is provided whose one end section 44 is supported by the body section 20, which support 42 leads through an opening 46 in the interior window 52, and whose other end section 48 engages an indentation 50 of the exterior window 32.

Figures 3, 4:
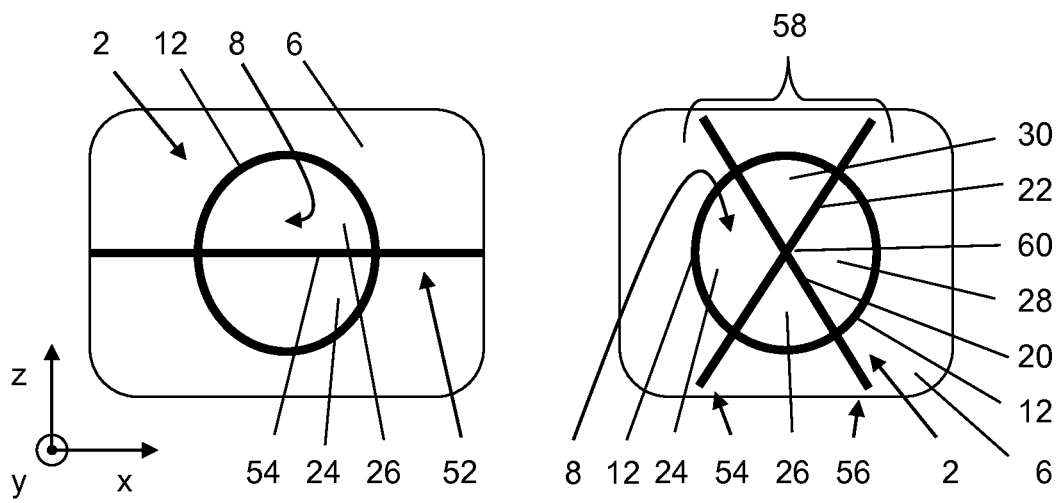
FIG. 3 a top view of a second embodiment according to the invention.
FIG. 4 a top view of a third exemplary embodiment.

FIG. 3 shows a top view of a window system 2 with a window package 8 and a window frame 12 of an aircraft fuselage which shows a stringer 52 as a stiffening element. The stringer 52 is attached on the inside to an exterior skin 6, and a body section 20 crosses the window system 2 so that two windows sections 24, 26 that are situated one on top of the other in the direction of the vertical axis z of the aircraft are formed. The design of this window system 2 and the gradient of the body section 20 corresponds to the window system 2, with the bridging frame element section 20, described in the context of FIG. 2.

FIG. 4 shows a top view of a window system 2 with a window package 8 and a window frame 12 of an aircraft fuselage, in which the stiffening elements form diagonal grid stays 54, 56, thus forming a grid 58. The grid 58 extends on the interior circumference over the outer skin 6 and preferably comprises a fibre composite material. In each case one of the body sections 20, 22 of the grid stays 54, 56 crosses the window systems 2 and each pair meets at a nodal point 60, as a result of which, depending on the mesh size, several window sections 24, 26, 28, 30 are formed. In the exemplary embodiment shown, four window sections 24, 26, 28, 30 are formed.

The invention discloses an aircraft fuselage having a plurality of window packages 8, 10 and a plurality of stiffening elements 16, 18; 52; 54, 56 for stiffening the aircraft fuselage, and at least some of them cross the window packages 8, 10, whereby the aircraft fuselage is built in a differential manner and the window packages 8, 10 are attached to window frames 12, 14.

LIST OF REFERENCE CHARACTERS

2 Window system
4 Window system
6 Exterior skin
8 Window package
10 Window package
12 Window frame
14 Window frame
16 Frame element
18 Frame element
20 Body section
22 Body section
24 Window section
26 Window section
28 Window section
30 Window section
32 Exterior window
34 Interior window
36 Interior space
38 Protective window
40 Space
42 Support
44 End section
46 Opening
48 End section
50 Indentation
52 Stringer
54 Grid stay
56 Grid stay
58 Grid
60 Nodal point
A Frame element spacing
x Longitudinal axis of the aircraft
y Transverse axis of the aircraft
z Vertical axis of the aircraft

What is claimed is:

1. An aircraft fuselage comprising:
an exterior skin;
at least one window frame;
at least one window package disposed in a breakout of the exterior skin and attached to the at least one window frame; and
a plurality of stiffening elements configured to stiffen the exterior skin, wherein at least one of the stiffening elements crosses the at least one window package so as to form two window sections, wherein the at least one stiffening element includes at least one recess configured to receive the at least one window frame.

2. The aircraft fuselage as recited in claim 1, wherein the at least one stiffening element crosses the at least one window frame in an arch formation.

3. The aircraft fuselage as recited in claim 1, wherein the at least one stiffening element crosses the at least one window frame in a step formation.

4. The aircraft fuselage as recited in claim 1, wherein the plurality of stiffening elements include at least one of circumferential stiffeners and longitudinal stiffeners.

5. The aircraft fuselage as recited in claim 1, wherein the plurality of stiffening elements form a grid.

6. The aircraft fuselage as recited in claim 1, wherein the at least one window package includes an exterior window and an interior window, and wherein at least one of the stiffening elements are configured to support at least one of the exterior and the interior window.

7. An aircraft fuselage comprising:
an exterior skin;
at least one window frame;
at least one window package disposed in a breakout of the exterior skin and attached to the at least one window frame, the at least one window package including an exterior window and an interior window;
a plurality of stiffening elements configured to stiffen the exterior skin, wherein at least one of the stiffening elements crosses the at least one window package; and
a protective window disposed on a cabin side of the fuselage, wherein the plurality of stiffening elements are disposed between the protective window and the interior window,
wherein at least one of the stiffening elements are configured to support at least one of the exterior and the interior window.

8. The aircraft fuselage as recited in claim 7, wherein the protective window is configured to provide thermal insulation.

9. The aircraft fuselage as recited in claim 1, wherein the plurality of stiffening elements include one of metal components and fibre composite components.

10. The aircraft fuselage as recited in claim 1, wherein the exterior skin includes one of a metal component and a fibre composite component.

* * * * *